United States Patent
Lai et al.

(10) Patent No.: US 8,120,323 B2
(45) Date of Patent: Feb. 21, 2012

(54) HIGH EFFICIENCY CHARGING CIRCUIT AND POWER SUPPLY SYSTEM HAVING SUCH HIGH EFFICIENCY CHARGING CIRCUIT

(75) Inventors: Yuan-Fang Lai, Taoyuan Hsien (TW); Min-Chou Huang, Taoyuan Hsien (TW); Chiu-Feng Wang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 482 days.

(21) Appl. No.: 12/356,726

(22) Filed: Jan. 21, 2009

(65) Prior Publication Data

US 2009/0189571 A1 Jul. 30, 2009

(30) Foreign Application Priority Data

Jan. 28, 2008 (TW) .............................. 97103175 A

(51) Int. Cl.
*H02J 7/04* (2006.01)

(52) U.S. Cl. ........................................ 320/128; 327/536

(58) Field of Classification Search .................. 320/126, 320/128; 324/443, 450; 327/536
See application file for complete search history.

(56) References Cited

U.S. PATENT DOCUMENTS

2006/0033473 A1* 2/2006 Stanzel et al. ................ 320/128

* cited by examiner

*Primary Examiner* — Vincent Q Nguyen
(74) *Attorney, Agent, or Firm* — Kirton & McConkie; Evan R. Witt

(57) ABSTRACT

A charging circuit includes a main power circuit, a DC-to-DC converting circuit, a detection circuit and a controller. The main power circuit is electrically connected to a power source for converting an input voltage from the power source into a first voltage. The DC-to-DC converting circuit is electrically connected to the main power circuit for converting the first voltage into a second voltage to charge the energy storage element. The detection circuit is electrically connected to the main power circuit and the DC-to-DC converting circuit for detecting a terminal voltage of the energy storage element and the first voltage from the main power circuit, thereby generating a feedback signal. The controller is electrically connected to the detection circuit and the main power circuit for controlling operations of the first switching element in response to the feedback signal, so that the first voltage is adjustable according to the second voltage.

18 Claims, 4 Drawing Sheets

HIGH EFFICIENCY CHARGING CIRCUIT AND POWER SUPPLY SYSTEM HAVING SUCH HIGH EFFICIENCY CHARGING CIRCUIT

FIELD OF THE INVENTION

The present invention relates to a charging circuit, and more particularly to a high efficiency charging circuit. The present invention also relates to a power supply system having such a high efficiency charging circuit.

BACKGROUND OF THE INVENTION

Recently, the general trends in designing portable electronic devices are toward small size, light weightiness and easy portability. The portable electronic devices such as mobile phones, personal digital assistants (PDAs), digital still cameras, digital video cameras, notebook computers and the like have built-in batteries. If no external power supply apparatus is provided to power the portable electronic device, the built-in battery is usually used as the main power source. If the power supplied from the battery is insufficient, the user needs to charge the built-in battery.

FIG. 1 is a schematic circuit block diagram of a conventional charging circuit. The charging circuit 1 of FIG. 1 principally includes an AC-to-DC converting circuit 11, a DC-to-DC converting circuit 12 and a filter capacitor $C_{bus}$. The AC-to-DC converting circuit 11 is electrically connected to the DC-to-DC converting circuit 12 and the filter capacitor $C_{bus}$. The DC-to-DC converting circuit 12 is electrically connected to a charger. An input AC voltage $V_{in}$ is received and converted by the AC-to-DC converting circuit 11 into a high DC voltage. The noise contained in the high DC voltage is filtered off by the filter capacitor $C_{bus}$, thereby creating a first DC voltage $V_{bus}$. The first DC voltage $V_{bus}$ is then converted by the DC-to-DC converting circuit 12 into a regulated DC voltage required for charging the battery 13.

In the conventional charging circuit 1, the battery is charged by a constant current. In other words, the current $I_b$ outputted from the DC-to-DC converting circuit 12 is substantially constant in order to continuously and stably charge the battery 13. As the charge capacity of the battery 13 is increased, however, the voltage difference $V_b$ between both terminals of the battery 13 is increased. If the current $I_b$ outputted from the DC-to-DC converting circuit 12 continuously and stably charge the battery 13, the voltage difference $V_b$ between both terminals of the battery 13 is continuously increased.

Furthermore, the first DC voltage $V_{bus}$ outputted from the AC-to-DC converting circuit 11 is usually constant. By the DC-to-DC converting circuit 12, the first DC voltage $V_{bus}$ is converted into the regulated second DC voltage, which is equal to the voltage difference $V_b$ between both terminals of the battery 13. As a consequence, the magnitude of the second DC voltage is changed as the charge capacity of the battery 13. Generally, the relation between the first DC voltage $V_{bus}$ and the second DC voltage $V_b$ can be written as a formula: $V_b = V_{bus} \times D \times N$, where D is a duty cycle and N is a turn ratio. Since the first DC voltage $V_{bus}$ and the turn ratio N in the above formula are constant values, the second DC voltage $V_b$ is in direct proportion to the duty cycle D. In a case that the battery 13 has the minimum charge capacity, the voltage difference between both terminals of the battery 13 is minimum and thus the second DC voltage $V_b$ and the duty cycle D are minimum. Whereas, in a case that the battery 13 has the maximum charge capacity, the voltage difference between both terminals of the battery 13 is maximum and thus the second DC voltage $V_b$ and the duty cycle D are maximum.

Generally, the operating efficiency of the DC-to-DC converting circuit 12 is dependent on the duty cycle D. If the DC-to-DC converting circuit 12 is operated at a high duty cycle D, the operating efficiency is relatively higher. Whereas, if the DC-to-DC converting circuit 12 is operated at a low duty cycle D, the operating efficiency is relatively lower. Under this circumstance, the operating efficiency of the DC-to-DC converting circuit 12 is dependent on the charge capacity of the battery 13. That is, the charging circuit 1 has a low operating efficiency when the battery 13 has low charge capacity but a high operating efficiency when the battery 13 has high charge capacity. On the whole, the operating efficiency of the charging circuit 1 is unsatisfactory.

Therefore, there is a need of providing a high efficiency charging circuit so as to obviate the drawbacks encountered from the prior art.

SUMMARY OF THE INVENTION

It is an object of the present invention to provide charging circuit, having a high operating efficiency independent of the charge capacity of the battery so as to obviate the drawbacks encountered from the prior art.

The present invention also relates to a power supply system having such a high efficiency charging circuit.

In accordance with an aspect of the present invention, there is provided a charging circuit for charging an energy storage element. The charging circuit includes a main power circuit, a DC-to-DC converting circuit, a detection circuit and a controller. The main power circuit includes at least a first switching element and is electrically connected to a power source for converting an input voltage from the power source into a first voltage. The DC-to-DC converting circuit is electrically connected to the main power circuit for converting the first voltage into a second voltage to charge the energy storage element. The detection circuit is electrically connected to output terminals of the main power circuit and the DC-to-DC converting circuit for detecting a terminal voltage of the energy storage element and the first voltage from the main power circuit, thereby generating a feedback signal. The controller is electrically connected to the detection circuit and the first switching element of the main power circuit for controlling operations of the first switching element in response to the feedback signal, so that the first voltage is adjustable according to the second voltage.

In accordance with another aspect of the present invention, there is provided a power supply system. The power supply system includes a battery module, an AC-to-DC converter, a charging circuit, an inverter, a bypass, a changeover switch and a system controller. The battery module is used for storing electric power therein. The AC-to-DC converter is used for receiving a first AC voltage from a power input terminal and converting the first AC voltage into a DC voltage. The charging circuit is interconnected between the power input terminal and the battery module or between the AC-to-DC converter and the battery module for charging the battery module. The inverter is electrically connected to the AC-to-DC converter for converting the DC voltage into a second AC voltage. The bypass has an end connected to the power input terminal. The changeover switch is connected to the other end of the bypass, the inverter and a power output terminal. The system controller is electrically connected to the power input terminal, the AC-to-DC converter, the charging circuit and the inverter for controlling operations of the power supply system. The charging circuit includes a main power circuit, a DC-to-DC converting circuit, a detection circuit and a pulse width modulation controller. The main power circuit includes at least a first switching element for converting an input voltage into a first voltage. The DC-to-DC converting circuit is electrically connected to the main power circuit for converting the first voltage into a second voltage to charge the energy storage element. The detection circuit is electrically connected to output terminals of the main power circuit and the DC-to-DC converting circuit for detecting a terminal voltage of the battery module and the first voltage from the main power circuit, thereby generating a feedback signal. The pulse width modulation controller is electrically connected to the detection circuit and the first switching element of the main power circuit for controlling operations of the first switching element in response to the feedback signal, so that the first voltage is adjustable according to the second voltage.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
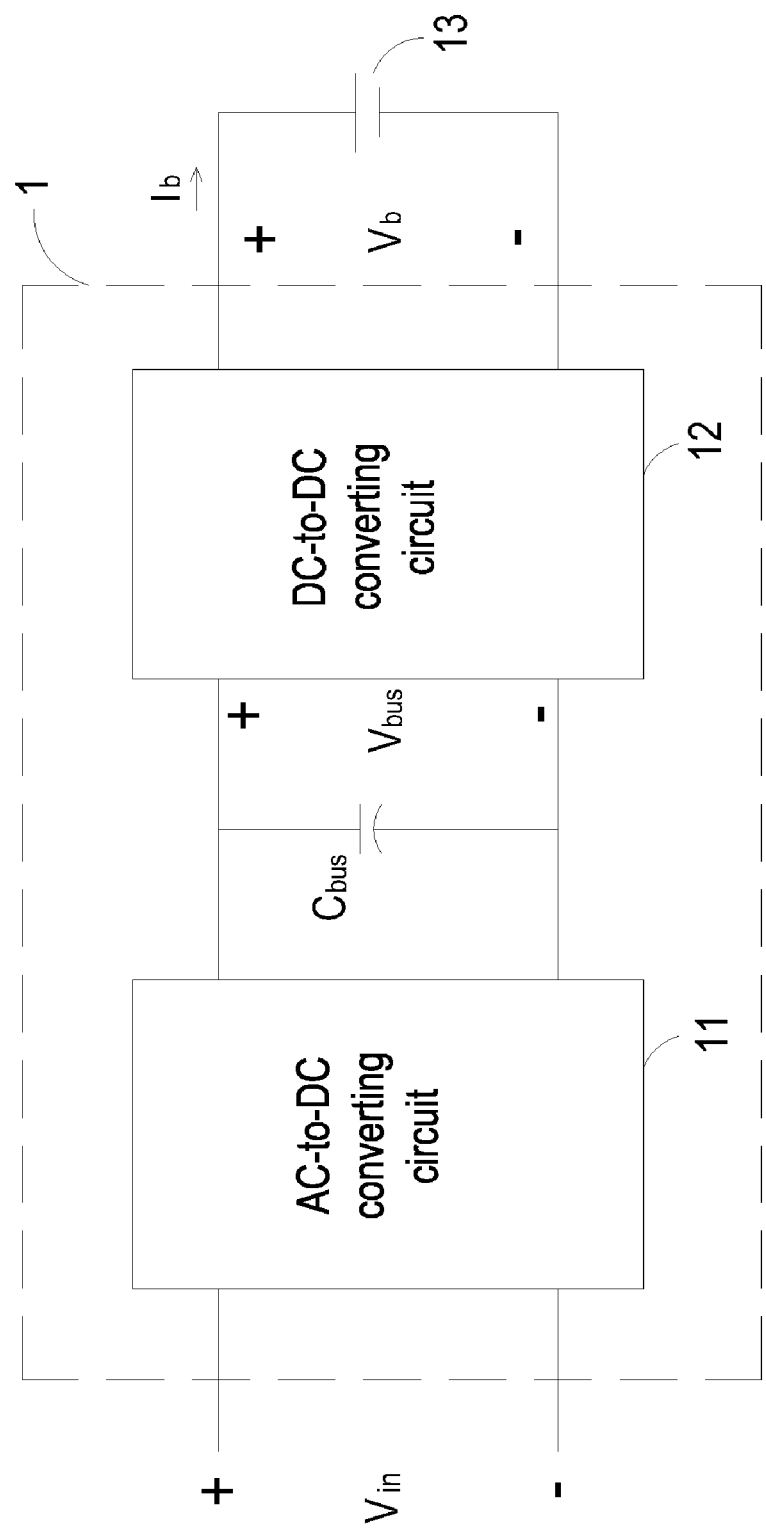
FIG. 1 is a schematic circuit block diagram of a conventional charging circuit.
Figure 2:
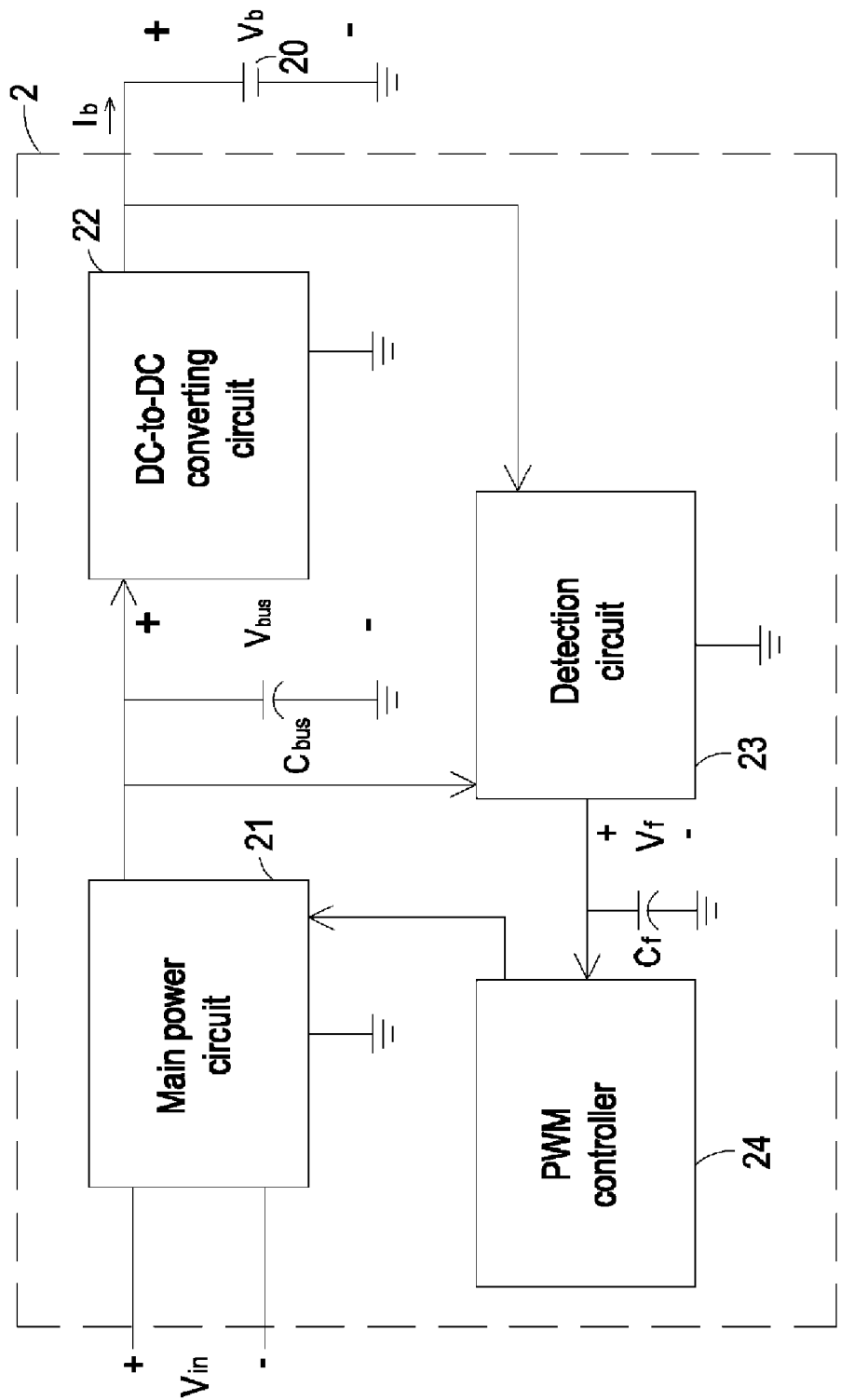
FIG. 2 is a schematic circuit block diagram of a high efficiency charging circuit according to a preferred embodiment of the present invention.

Referring to FIG. 2, a schematic circuit block diagram of a high efficiency charging circuit according to a preferred embodiment of the present invention is illustrated. This high efficiency charging circuit 2 is adapted to charge an energy storage element 20. An example of the energy storage element 20 includes but is not limited to a battery. The high efficiency charging circuit 2 of FIG. 2 principally includes a main power circuit 21, a DC-to-DC converting circuit 22, a detection circuit 23 and a pulse width modulation (PWM) controller 24. The main power circuit 21 is electrically connected to a power source so as to receive an input voltage $V_{in}$ (e.g. an AC voltage or a DC voltage). By the main power circuit 21, the input voltage $V_{in}$ is converted into a first voltage $V_{bus}$ (e.g. a DC voltage). The DC-to-DC converting circuit 22 is electrically connected to the main power circuit 21 and the energy storage element 20. By the DC-to-DC converting circuit 22, the first voltage $V_{bus}$ outputted from the main power circuit 21 is converted into a regulated DC voltage, i.e. a second voltage. The second voltage is substantially equal to the voltage difference $V_b$ between both terminals of the energy storage element 20. In the context, the voltage difference $V_b$ between both terminals of the energy storage element 20 is also referred as the second voltage $V_b$. The detection circuit 23 is electrically connected to the output terminal of the main power circuit 21 and the output terminal of the DC-to-DC converting circuit 22. When the first voltage $V_{bus}$ outputted from the main power circuit 21 and the voltage difference $V_b$ between both terminals of the energy storage element 20 are detected by the detection circuit 23, a feedback voltage $V_f$ is generated. The PWM controller 24 is electrically connected to the detection circuit 23 and the main power circuit 21. In response to the feedback voltage $V_f$, the first voltage $V_{bus}$ outputted from the main power circuit 21 is adjusted by the PWM controller 24 according to the second voltage $V_b$.

Please refer to FIG. 2 again. The high efficiency charging circuit 2 further includes a filter capacitor $C_{bus}$ and a feedback capacitor $C_f$. The filter capacitor $C_{bus}$ is electrically connected to the output terminal of the main power circuit 21 for filtering off undesirable noise contained in the DC voltage outputted from the main power circuit 21. The feedback capacitor $C_f$ is electrically connected to the output terminal of the detection circuit 23 for filtering off undesirable noise contained in the feedback voltage $V_f$.

In the high efficiency charging circuit 2, the second voltage $V_b$ is increased as the charge capacity of the energy storage element 20 is increased. In accordance with a key feature of the present invention, the first voltage $V_{bus}$ outputted from the main power circuit 21 is adjusted according to the second voltage $V_b$. Likewise, the relation between the first voltage $V_{bus}$ and the second voltage $V_b$ can be written as a formula: $V_b = V_{bus} \times D \times N$, where D is a duty cycle and N is a turn ratio. Since the first voltage $V_{bus}$ received by the DC-to-DC converting circuit 22 is changed as the voltage difference $V_b$ between both terminals of the energy storage element 20, the DC-to-DC converting circuit 22 can be operated at a relatively higher duty cycle D so as to achieve a high operating efficiency.

In this embodiment, the first voltage $V_{bus}$ outputted from the main power circuit 21 is controlled by the PWM controller 24. Moreover, the feedback voltage $V_f$ generated from the detection circuit 23 is dependent on the first voltage $V_{bus}$ outputted from the main power circuit 21 and the voltage difference $V_b$ between both terminals of the energy storage element 20. As a consequence, the first voltage $V_{bus}$ outputted from the main power circuit 21 can be controlled at a proper level such that the DC-to-DC converting circuit 22 is operated at a relatively higher duty cycle D.

Figure 3:
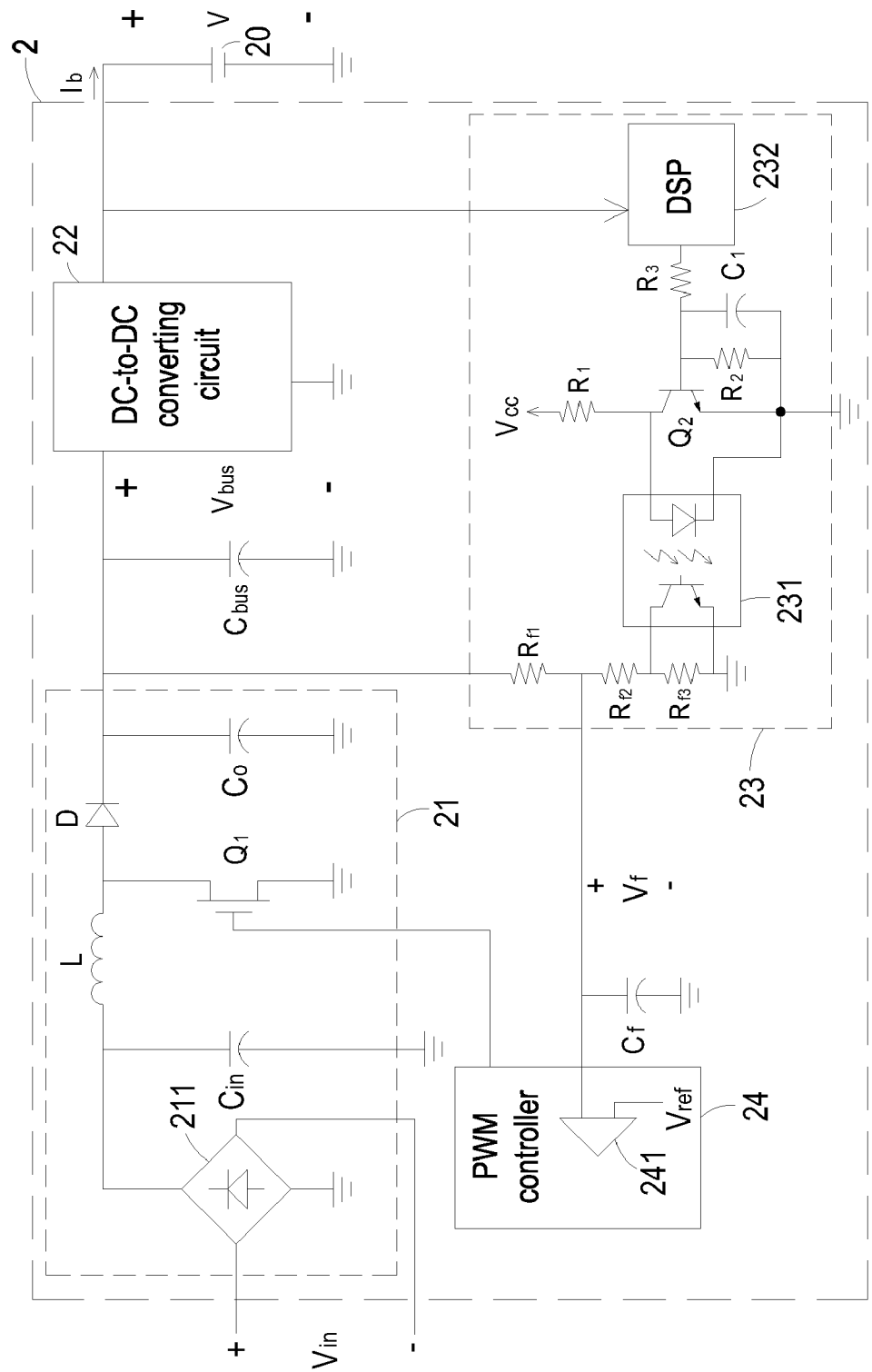
FIG. 3 is a schematic detailed circuit block diagram of a high efficiency charging circuit according to a preferred embodiment of the present invention.

FIG. 3 is a schematic detailed circuit block diagram of a high efficiency charging circuit according to a preferred embodiment of the present invention. As shown in FIG. 3, the main power circuit 21 of the high efficiency charging circuit 2 includes a first switching element $Q_1$. The first switching element $Q_1$ is electrically connected to the PWM controller 24. Whether the first switching element $Q_1$ is either turned on or turned off is controlled by the PWM controller 24 according to the voltage value of the feedback voltage $V_f$. An example of the first switching element $Q_1$ includes but is not limited to a bipolar junction transistor (BJT), a junction field effect transistor (JFET) or a metal oxide semiconductor field effect transistor (MOSFET).

Please refer to FIG. 3 again. The main power circuit 21 further includes a bridge rectifier 211, an input capacitor $C_{in}$, an inductor L, a diode D and an output capacitor $C_o$. An input end of the bridge rectifier 211 is electrically connected to the power source. An output end of the bridge rectifier 211 is electrically connected to the input capacitor $C_{in}$ and the inductor L. The input voltage $V_{in}$ is received by the bridge rectifier 211 and rectified into DC voltage. The ripple voltage contained in the DC voltage is smoothed by the input capacitor $C_{in}$. The first switching element $Q_1$ is electrically connected with the positive end of the diode D, the inductor L and the PWM controller 24. The negative end of the diode D is electrically connected to the output terminal of the main power circuit 21 and the output capacitor $C_o$. In response to an enabling signal (e.g. a high-level voltage) issued from the PWM controller 24, the first switching element $Q_1$ is conducted such that electrical energy transmitted from the PWM controller 24 is stored in the inductor L. In response to an disenabling signal (e.g. a low-level voltage) issued from the PWM controller 24, the first switching element $Q_1$ is shut off such that energy stored in the inductor L is transmitted to the input terminal of the DC-to-DC converting circuit 22 through the diode D. Under this circumstance, the first voltage $V_{bus}$ outputted from the main power circuit 21 is equal to the sum of the voltage across the inductor L and the magnitude of the input voltage $V_{in}$, so that the main power circuit 21 has a function of boosting the voltage value. In other words, a proper value of the first voltage $V_{bus}$ is obtained by controlling the on-off time of the first switching element $Q_1$ by the PWM controller 24.

Please refer to FIG. 3 again. The detection circuit 23 includes a first feedback resistor $R_{f1}$, a second feedback resistor $R_{f2}$, a third feedback resistor $R_{f3}$, a photo coupler 231, a first resistor $R_1$, a second resistor $R_2$, a third resistor $R_3$, a second switching element $Q_2$, a first capacitor $C_1$ and a digital signal processor (DSP) 232. The first feedback resistor $R_{f1}$, the second feedback resistor $R_{f2}$ and the third feedback resistor $R_{f3}$ are connected in series. The first feedback resistor $R_{f1}$ has an end coupled to the output terminal of the main power circuit 21 and the other end coupled to the second feedback resistor $R_{f2}$ and the output terminal of the detection circuit 23. The output terminal of the photo coupler 231 is connected in parallel with the third feedback resistor $R_{f3}$. The input terminal of the photo coupler 231 is coupled with the collector and the emitter of the second switching element $Q_2$. The first resistor $R_1$ is coupled with a DC driving power source $V_{cc}$ (e.g. 12V) and the collector of the second switching element $Q_2$. The second resistor $R_2$ and the first capacitor $C_1$ are interconnected between the base and the emitter of the second switching element $Q_2$. The third resistor $R_3$ is coupled with the base of the second switching element $Q_2$ and the DSP 232. The DSP 232 is coupled with the output terminal of the DC-to-DC converting circuit 22 and the third resistor $R_3$.

The operations of the detection circuit 23 will be illustrated in more details as follows. For operating the DC-to-DC converting circuit 22 at a high duty cycle D, the feedback ratio k of the detection circuit 23 is changed according to the first voltage $V_{bus}$ outputted from the main power circuit 21 and the voltage difference $V_b$ between both terminals of the energy storage element 20. In a case that the energy storage element 20 has low charge capacity, the voltage difference $V_b$ between both terminals of the energy storage element 20 is relatively low. According to the relation formula $V_b = V_{bus} \times D \times N$, the voltage value of the first voltage $V_{bus}$ should be low enough to have the DC-to-DC converting circuit 22 operated at a first high duty cycle D. In other words, in order to maintain the duty cycle D of operating the DC-to-DC converting circuit 22 at a constant high level, the first voltage $V_{bus}$ outputted from the main power circuit 21 needs to be lowered and thus a relatively low second voltage $V_b$ is obtained. Whereas, in another case that the energy storage element 20 has high charge capacity, the voltage difference $V_b$ between both terminals of the energy storage element 20 is relatively high. According to the relation formula $V_b = V_{bus} \times D \times N$, the voltage value of the first voltage $V_{bus}$ should be high enough to have the DC-to-DC converting circuit 22 operated at a second high duty cycle D. In other words, in order to maintain the duty cycle D of operating the DC-to-DC converting circuit 22 at a constant high level, the first voltage $V_{bus}$ outputted from the main power circuit 21 needs to be raised and thus a relatively high second voltage $V_b$ is obtained. In some embodiments, the first high duty cycle D when the voltage difference $V_b$ is low and the second high duty cycle D when the voltage difference $V_b$ is high can be identical or different. According to the characteristics of the DC-to-DC converting circuit 22 and the energy storage element 20, the first high duty cycle D and the second high duty cycle D are variable so that the operating efficiency of the DC-to-DC converting circuit 22 is enhanced.

In a case that a low voltage difference $V_b$ between both terminals of the energy storage element 20 is detected by the DSP 232 of the detection circuit 23, the second switching element $Q_2$ is controlled by the DSP 232 to be shut off. Under this circumstance, the photo coupler 231 is enabled and the third feedback resistor $R_{f3}$ is bypassed, so that a low feedback ratio $k = R_{f2}/(R_{f1}+R_{f2})$ is obtained. Whereas, in another case that a high voltage difference $V_b$ between both terminals of the energy storage element 20 is detected by the DSP 232 of the detection circuit 23, the second switching element $Q_2$ is controlled by the DSP 232 to be conducted. Under this circumstance, the photo coupler 231 is disenabled and the third feedback resistor $R_{f3}$ is no longer bypassed, so that a high feedback ratio $k = (R_{f2}+R_{f3})/(R_{f1}+R_{f2}+R_{f3})$ is obtained.

For example, if the energy storage element 20 has low charge capacity, the voltage difference $V_b$ between both terminals of the energy storage element 20 is 0.9V; otherwise, if the energy storage element 20 has high charge capacity, the voltage difference $V_b$ between both terminals of the energy storage element 20 is 1.4V. Provided that the turn ratio N is 0.005 and the duty cycle D is intended to be maintained at about 0.9, the first voltage $V_{bus}$ to be received by the DC-to-DC converting circuit 22 is preferably adjusted to about 200V when the voltage difference $V_b$ is low (i.e. 0.9V) or adjusted to about 311V when the voltage difference $V_b$ is high (i.e. 1.4V). Therefore, the charging circuit can be maintained at a high operating efficiency.

Please refer to FIG. 3 again. The PWM controller 24 further includes a comparator 241. The feedback voltage $V_f$ and a reference voltage $V_{ref}$ are inputted into the comparator 241. By comparing the feedback voltage $V_f$ with the reference voltage $V_{ref}$ by the comparator 241, the PWM controller 24 controls on/off statuses of the first switching element $Q_1$ of the main power circuit 21. Since $V_f = k \times V_{bus}$, the first voltage $V_{bus}$ outputted from the main power circuit 21 is changeable by adjusting the feedback ratio k. Since the first voltage $V_{bus}$ received by the DC-to-DC converting circuit 22 is changed as the voltage difference $V_b$ between both terminals of the energy storage element 20, the DC-to-DC converting circuit 22 can be operated at a high operating efficiency. In this embodiment, a low feedback ratio $k = R_{f2}/(R_{f1}+R_{f2})$ is obtained when the voltage difference $V_b$ between both terminals of the energy storage element 20 is low; and a high feedback ratio $k = (R_{f2}+R_{f3})/(R_{f1}+R_{f2}+R_{f3})$ is obtained when the voltage difference $V_b$ between both terminals of the energy storage element 20 is high.

Furthermore, the feedback ratio k of the detection circuit 23 can be diverse by calculation or using a lookup table, so that the DC-to-DC converting circuit 22 is maintained at a relatively higher duty cycle D and a high operating efficiency is achieved. For example, the voltage difference $V_b$ between both terminals of the energy storage element 20 and the first voltage $V_{bus}$ outputted from the main power circuit 21 can be obtained by an analog-to-digital converter. The voltage difference $V_b$ and the first voltage $V_{bus}$ are processed by the DSP 232 through calculation or a lookup table, thereby obtaining a suitable feedback ratio k. At this feedback ratio k, the DC-to-DC converting circuit 22 can be maintained at a relatively higher duty cycle D. Afterwards, a corresponding feedback voltage $V_f$ is obtained by using a digital-to-analog converter.

Figure 4:
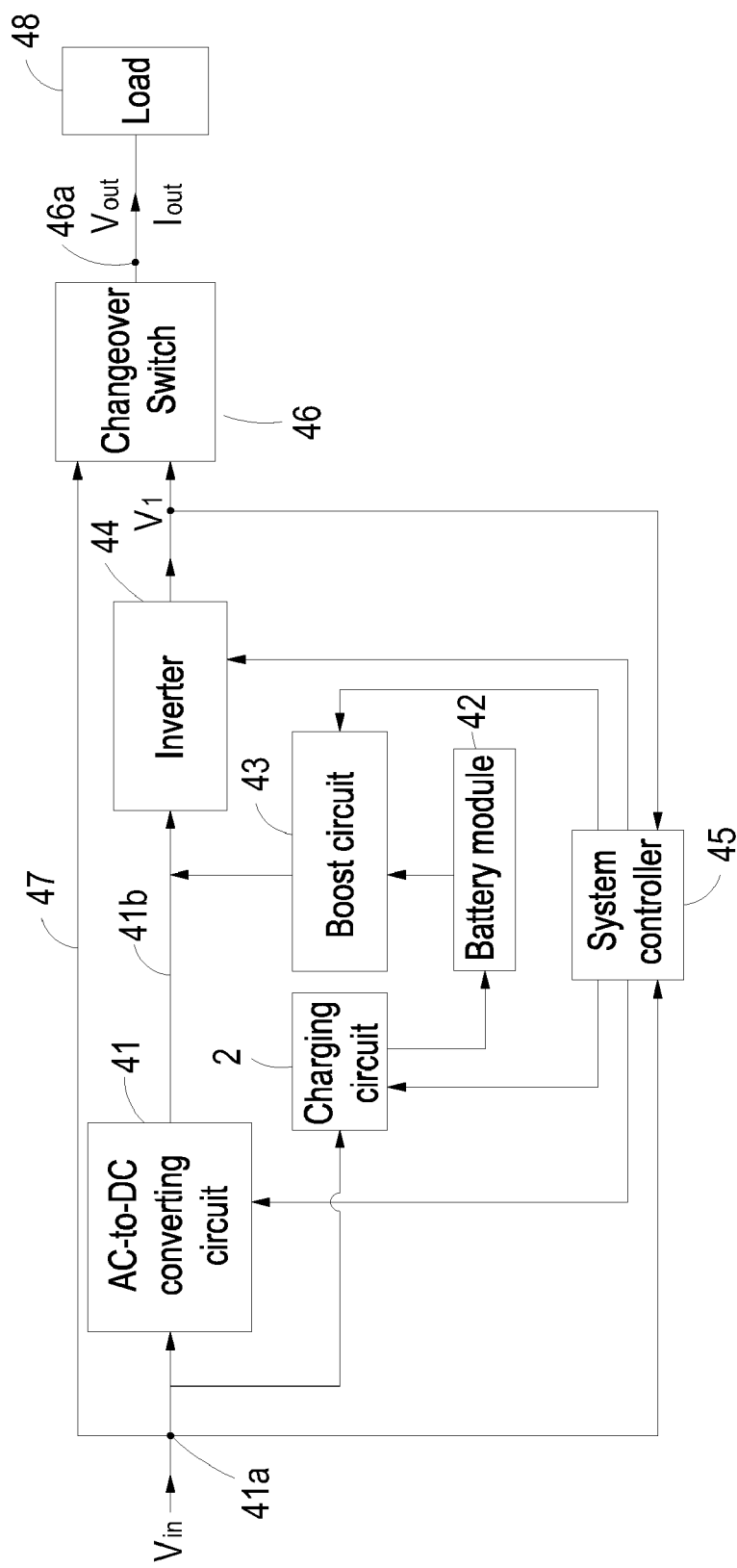
FIG. 4 is a schematic circuit block diagram of an uninterruptible power supply system having the high efficiency charging circuit of the present invention.

FIG. 4 is a schematic circuit block diagram of an uninterruptible power supply system having the high efficiency charging circuit of the present invention. The uninterruptible power supply system 4 of FIG. 4 principally includes an AC-to-DC converter 41, a high efficiency charging circuit 2, a battery module 42, a boost circuit 43, an inverter 44, a system controller 45, a changeover switch 46, a power input terminal 41a, a DC bus bar 41b, a power output terminal 46a and a bypass 47. The operations of the uninterruptible power supply system 4 will be illustrated in more details as follows.

An input voltage $V_{in}$ (or a first AC voltage) is inputted into the power input terminal 41a. The AC-to-DC converter 41 is interconnected between the power input terminal 41a and the DC bus bar 41b for converting the input voltage $V_{in}$ into a DC voltage of a predetermined voltage level. The high efficiency charging circuit 2 provided by the present invention is interconnected between the power input terminal 41a and the battery module 42 for converting the input voltage $V_{in}$ into a DC voltage required for charging the battery module 42. The boost circuit 43 is for example a boost DC-to-DC converter. The boost circuit 43 is interconnected between the battery module 42 and the DC bus bar 41b for converting the output voltage from the battery module 42 into a DC voltage to be received by the inverter 44. The inverter 44 is interconnected between the DC bus bar 41b and the changeover switch 46 for converting the DC voltage from the DC bus bar 41b into a stable second AC voltage $V_1$. The changeover switch 46 is connected to the bypass 47, the inverter 44 and the power output terminal 46a. An example of the changeover switch 46 includes but is not limited to a silicon-controlled rectifier (SCR), a bidirectional triode thyristor (TRIAC) switch, an insulated gate bipolar transistor (IGBT), a metal oxide semiconductor field effect transistor (MOSFET) or a relay. The bypass 47 is interconnected between the changeover switch 46 and the power input terminal 41a. The system controller 45 is connected to the power input terminal 41a, the AC-to-DC converter 41, the high efficiency charging circuit 2, the boost circuit 43 and the inverter 44 for controlling operations of the uninterruptible power supply system 4.

When the input voltage $V_{in}$ is normally provided, under control of the system controller 45, the input voltage $V_{in}$ inputted into the AC-to-DC converter 41 is converted into a DC voltage of a predetermined voltage level, which is transmitted to the inverter 44. Under control of the system controller 45, the DC voltage is converted by the inverter 44 into the stable second AC voltage $V_1$. Through the changeover switch 46, the second AC voltage $V_1$ is provided to the load 48, in which the second AC voltage $V_1$ outputted from the inverter 44 is equal to the load voltage $V_{out}$. At the same time when the input voltage $V_{in}$ is normally provided, the input voltage $V_{in}$ is converted by the high efficiency charging circuit 2 into a DC voltage required for charging the battery module 42.

When the input voltage $V_{in}$ is unavailable or deteriorated, under control of the system controller 45, the electric power stored in the battery module 42 is converted by the boost circuit 43 into a DC voltage to be received by the inverter 44. Under control of the system controller 45, the DC voltage is converted by the inverter 44 into the second AC voltage V1. Through the changeover switch 46, the second AC voltage $V_1$ is provided to the load 48. As a consequence, the electric power for use in the load 48 is supplied by the battery module 42. In some embodiments, the battery module 42 includes a plurality of batteries. As the number of batteries is increased, the power supplying time is extended.

Since the input voltage $V_{in}$ is converted by the charging circuit 2 into a DC voltage required for charging the battery module 42 at a high operating efficiency when the input voltage $V_{in}$ is normally provided, the overall operating efficiency of the uninterruptible power supply system is enhanced. In this embodiment, the high efficiency charging circuit 2 can be interconnected between the power input terminal 41a and the battery module 42.

Moreover, the high efficiency charging circuit of the present invention can be used in the power supply apparatuses for outputting adjustable voltages required for powering a variety of loads. Consequently, the operating efficiencies of these power supply apparatuses are enhanced.

From the above description, the charging circuit can charge the battery module at a high operating efficiency because the first voltage $V_{bus}$ outputted from the main power circuit 21 is adjusted according to voltage difference $V_b$ between both terminals of the energy storage element 20. Regardless of whether the output voltage of the high efficiency charging circuit (i.e. the voltage difference $V_b$ between both terminals of the energy storage element 20) is high or low, the DC-to-DC converting circuit 22 is maintained at a relatively higher duty cycle D and thus a high operating efficiency is achieved. Moreover, the high efficiency charging circuit of the present invention can be used in the power supply apparatus so that the power supply apparatus can output a regulated DC voltage at a high operating efficiency.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A charging circuit for charging an energy storage element, said charging circuit comprising:

a main power circuit comprising at least a first switching element and electrically connected to a power source for converting an input voltage from said power source into a first voltage;

a DC-to-DC converting circuit electrically connected to said main power circuit for converting said first voltage into a second voltage to charge said energy storage element;

a detection circuit electrically connected to output terminals of said main power circuit and said DC-to-DC converting circuit for detecting a terminal voltage of said energy storage element and said first voltage from said main power circuit, thereby generating a feedback signal; and a controller electrically connected to said detection circuit and said first switching element of said main power circuit for controlling operations of said first switching element in response to said feedback signal, so that said first voltage is adjustable according to said second voltage;

wherein said feedback signal has a feedback voltage, and a feedback ratio of said feedback voltage to said first voltage is changed as said second voltage, wherein said first voltage outputted from said main power circuit is adjusted under control of said controller according to said feedback ratio such that said DC-to-DC converting circuit is operated at a constant duty cycle or a variable duty cycle within a predetermined range.

2. The charging circuit according to claim 1 further comprising a filter capacitor, which is electrically connected to said main power circuit and said DC-to-DC converting circuit, for filtering off noise.

3. The charging circuit according to claim 1 further comprising a feedback capacitor, which is electrically connected to said detection circuit and said controller.

4. The charging circuit according to claim 1 wherein said controller is a pulse width modulation controller.

5. The charging circuit according to claim 1 wherein said detection circuit further comprises a digital signal controller for calculating a feedback ratio corresponding to a different second voltage, and said feedback ratio is obtained by a resistor-dividing circuit.

6. The charging circuit according to claim 1 wherein said controller further comprises a comparator for comparing said feedback voltage with a reference voltage, thereby controlling on/off statuses of said first switching element of said main power circuit according to the comparing result.

7. The charging circuit according to claim 1 wherein said input voltage is an AC voltage or a DC voltage.

8. The charging circuit according to claim 1 wherein said first switching element is selected from a bipolar junction transistor, a junction field effect transistor or a metal oxide semiconductor field effect transistor.

9. The charging circuit according to claim 1 wherein said main power circuit further comprises:
    a bridge rectifier electrically connected to said power source for receiving and rectifying said input voltage;
    an input capacitor connected to said bridge rectifier;
    an inductor interconnected between said input capacitor and said first switching element;
    a diode connected to said first switching element; and
    an output capacitor connected to said diode.

10. A power supply system comprising:
    a battery module for storing electric power therein;
    an AC-to-DC converter for receiving a first AC voltage from a power input terminal and converting said first AC voltage into a DC voltage;
    a charging circuit interconnected between said power input terminal and said battery module or between said AC-to-DC converter and said battery module for charging said battery module;
    an inverter electrically connected to said AC-to-DC converter for converting said DC voltage into a second AC voltage;
    a bypass having an end connected to said power input terminal;
    a changeover switch connected to the other end of said bypass, said inverter and a power output terminal; and
    a system controller electrically connected to said power input terminal, said AC-to-DC converter, said charging circuit and said inverter for controlling operations of said power supply system,
    wherein said charging circuit comprises:
        a main power circuit comprising at least a first switching element for converting an input voltage into a first voltage;
        a DC-to-DC converting circuit electrically connected to said main power circuit for converting said first voltage into a second voltage to charge said energy storage element;
        a detection circuit electrically connected to output terminals of said main power circuit and said DC-to-DC converting circuit for detecting a terminal voltage of said battery module and said first voltage from said main power circuit, thereby generating a feedback signal; and
        a pulse width modulation controller electrically connected to said detection circuit and said first switching element of said main power circuit for controlling operations of said first switching element in response to said feedback signal, so that said first voltage is adjustable according to said second voltage.

11. The power supply system according to claim 10 wherein said charging circuit further comprises a filter capacitor, which is electrically connected to said main power circuit and said DC-to-DC converting circuit, for filtering off noise.

12. The power supply system according to claim 10 wherein said charging circuit further comprises a feedback capacitor, which is electrically connected to said detection circuit and said pulse width modulation controller.

13. The power supply system according to claim 10 wherein said feedback signal has a feedback voltage, and a feedback ratio of said feedback voltage to said first voltage is changed as said second voltage.

14. The power supply system according to claim 13 wherein said first voltage outputted from said main power circuit is adjusted under control of said pulse width modulation controller according to said feedback ratio such that said DC-to-DC converting circuit is operated at a constant duty cycle or a variable duty cycle within a predetermined range.

15. The power supply system according to claim 13 wherein said detection circuit further comprises a digital signal controller for calculating a feedback ratio corresponding to a different second voltage, and said feedback ratio is obtained by a resistor-dividing circuit.

16. The power supply system according to claim 13 wherein said pulse width modulation controller further comprises a comparator for comparing said feedback voltage with a reference voltage, thereby controlling on/off statuses of said first switching element of said main power circuit according to the comparing result.

17. The power supply system according to claim 10 wherein said first switching element is selected from a bipolar junction transistor, a junction field effect transistor or a metal oxide semiconductor field effect transistor.

18. The power supply system according to claim 10 further comprising a boost circuit electrically connected to said battery module, said system controller and said inverter for converting an output voltage from said battery module into a DC voltage to be received by said inverter.

* * * * *